Figure 1:
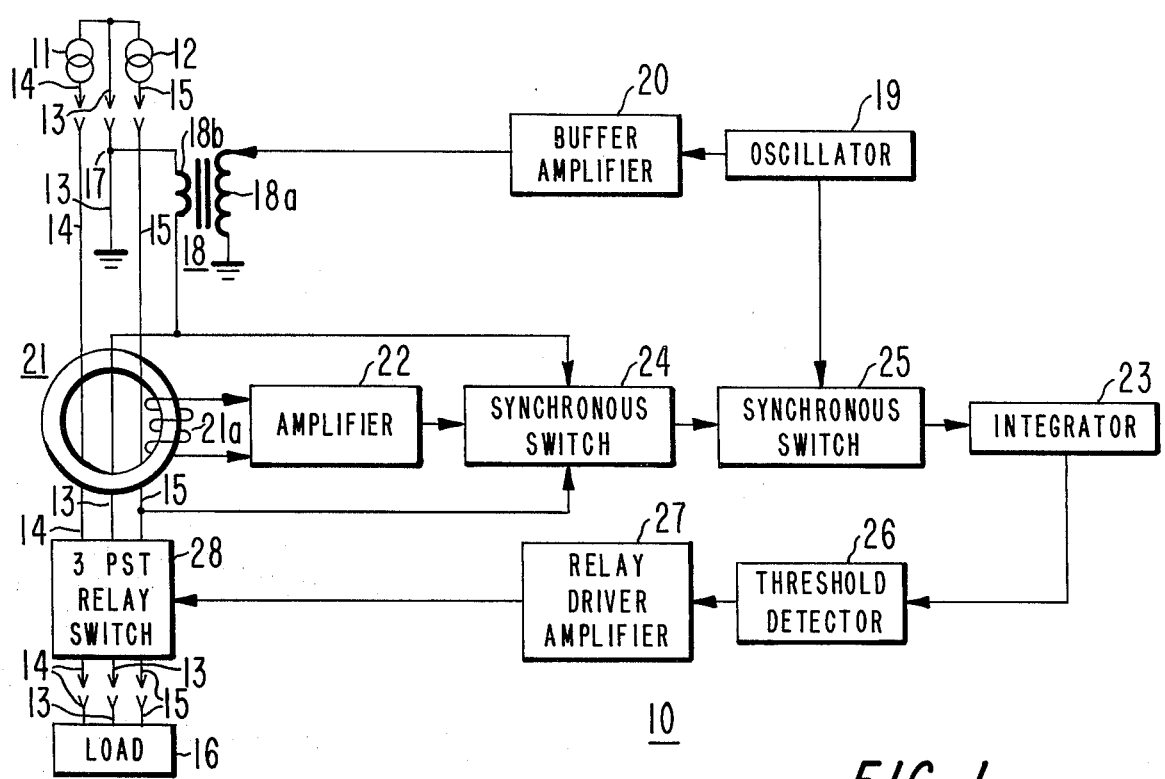

United States Patent [19]
Schade, Jr.

[11] 3,963,963
[45] June 15, 1976

[54] GROUND-FAULT DETECTION SYSTEM
[75] Inventor: Otto Heinrich Schade, Jr., North Caldwell, N.J.
[73] Assignee: RCA Corporation, New York, N.Y.
[22] Filed: Apr. 22, 1975
[21] Appl. No.: 570,434

[52] U.S. Cl. .............................. 317/18 D; 317/27 R
[51] Int. Cl.² .......................................... H02H 3/28
[58] Field of Search ............ 317/18 D, 27 R, 33 SC

[56] References Cited
UNITED STATES PATENTS

| | | |
|---|---|---|
| 3,597,656 | 8/1971 | Douglas ............................ 317/18 D |
| 3,611,035 | 10/1971 | Douglas ............................ 317/18 D |
| 3,857,069 | 12/1974 | Howell ............................. 317/18 D |

Primary Examiner—Harry Moose
Attorney, Agent, or Firm—H. Christoffersen; S. Cohen; A. L. Limberg

[57] ABSTRACT

A neutral ground fault detector couples oscillations from a local oscillator into the neutral conductor of an electric power transmission system whenever a ground-fault appears thereon. Oscillations appearing on the neutral conductor during ground-fault conditions are synchronously detected by homodyning them with oscillations obtained directly from the local oscillator, thereby to otain a direct-current indication of the ground fault on the neutral conductor.

5 Claims, 2 Drawing Figures

GROUND-FAULT DETECTION SYSTEM

The present invention relates to ground fault detection and interruption circuits for electric power transmission systems.

It is known in the ground fault detection art to employ a local oscillator for generating relatively high-frequency (e.g., 5kHz) oscillations for application to the neutral conductor of a relatively low frequency (e.g., 60Hz) power system. The neutral conductor is desirably grounded at but one point and for such condition, no high-frequency current will flow in the neutral conductor. However, when the undesirable condition arises that the neutral conductor has a fault to ground, a loop is formed in which high frequency current flows. This high frequency current is sensed and detected, and the detector response is used either to signal the presence of the neutral ground-fault or to interrupt delivery of power by the system. The high-frequency current flow during ground-fault condition is detected by full wave rectifying, filtering and voltage comparison steps. Systems of these general types are known as "neutral-ground fault detector" systems.

Neutral ground-fault detectors of the type just described are conventionally used in conjunction with circuits for detecting ground-faults occurring on any of the line conductors, that is, the other conductors beside the neutral conductor. These "line ground-fault detectors" conventionally use a differential current transformer having each of the line and neutral conductors as a primary and a secondary winding, or sensing coil, for sensing the sum of the instantaneous currents flowing to the load through the line conductors minus the sum of the instantaneous currents flowing from the load through the line conductors. In the absence of a ground fault on any of the line conductors other than the neutral conductor, this unbalance signal is zero-valued. During a ground-fault on a line conductor other than the neutral conductor, this unbalance signal has appreciable value which is detected. This detection is accomplished by synchronous detection or simple rectification followed by low-pass filtering and threshold detection steps. The detector response, provided when the unbalance signal exceeds a predetermined level, is used either to signal the presence of a line fault or to interrupt delivery of power by system.

Neutral ground-fault detectors are used together with line ground-fault detectors because a low-impedance ground fault on the neutral conductor will short-circuit the primary of the current transformer associated therewith and should this occur, the degree of coupling between the other lines and the line ground-fault detector is reduced. This, in turn, lessens the sensitivity of the detector, sufficiently in some cases that a subsequently occuring ground fault on one of the line conductors may go undetected. This would be particularly undesirable in ground-fault interruption circuits, in which power delivery is interrupted, since these systems are used primarily to safeguard persons from injury when their accidental contact to the power lines is the source of fault. The neutral ground-fault detector can be used to interrupt power delivery whenever a ground fault occurs on the neutral conductor, forestalling the possibility of protection against ground faults on the line conductors being compromised.

The problem with prior art neutral-fault detectors has been the difficulty in obtaining sensitive indications of ground faults on the neutral conductor without incurring false indications of ground faults as caused by the noise and transient distrubances likely to occur on the line. The level of local oscillations onto the neutral conductor should be kept as low as possible to avoid advarse effects upon some forms of load. For example, harmonics of the local oscillations may interfere with proper signal reception on radio equipment. So, to reduce the likelihood of false indications of ground faults, the selectivity of the neutral ground fault detector against noise and transient disturbances must be improved.

The present invention is directed to the use of synchronous detection in neutral ground-fault detectors, the synchronous detection being carried out at the frequency of the local oscillator, to implement increased selectivity of neutral ground-fault detection.

Figure 2:
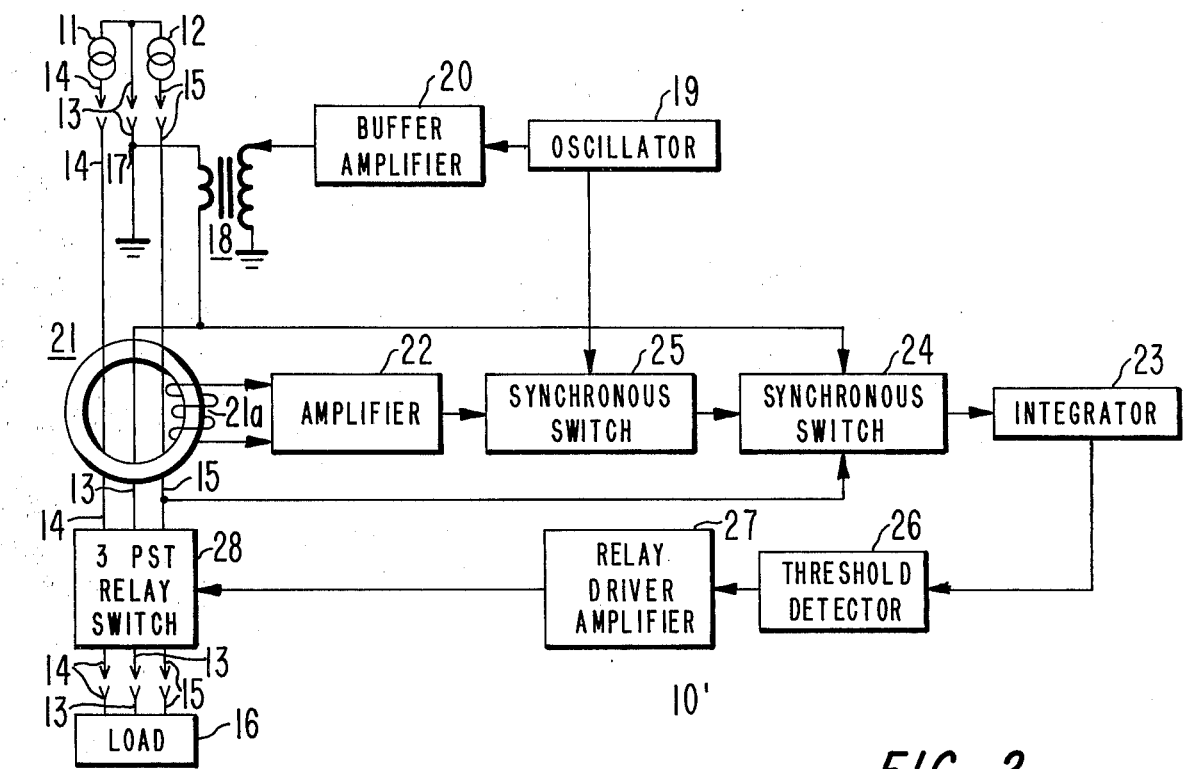

In the drawing:

FIG. 1 is block and schematic diagram of a ground fault interrupter system including a neutral ground-fault detector according to the present invention; and FIG. 2 is a block and schematic diagram of an alternative ground fault interrupter system including a neutral ground fault detector according to the present invention.

FIG. 1 shows a combined neutral-ground-fault detector and line ground-fault detector system 10 connected for use in three-wire grounded-neutral single-phase power distribution. Sources 11 and 12 supply respective a-c line potentials (e.g., at 120 volts and 60 Hz) between neutral conductor 13 and line conductors 14 and 15, respectively, for ultimate connection to a load 16, which may be either balanced or unbalanced in nature.

The neutral conductor is grounded to earth at point 17, and has the secondary winding 18b of a transformer 18 included therein on the load side of point 17. An oscillator 19 supplies oscillations at a repetition rate differing from the frequency of the a-c line potentials (e.g., 5000 Hz) which are amplified by a buffer amplifier 20 before their application to the primary winding 18a of transformer 18. So long as the conductors 13, 14 and 15 have no connection to ground except at point 17, there is no complete loop containing the secondary winding 18b of transformer 18, and there will be no current at the frequency of the oscillations coupled to the secondary winding 18b from the primary winding 18a. On the other hand, when a ground fault appears on any of the conductors 13, 14 and 15, a loop containing the secondary winding 18b of the transformer is completed and a current responsive to the oscillations is induced in the loop including the neutral conductor.

The conductors 13, 14 and 15 are connected as primaries of a differential current transformer 21, which has a secondary winding 21a (commonly identified by the term "sensing coil"). An "unbalance" current is induced in sensing coil 21a which has an instantaneous value proportional to the sum of the instantaneous currents flowing to a load 16 from sources 11 and 12 via conductors 13, 14 and 15 minus the sum of the instantaneous currents returning from load 16 to sources 11 and 12 via those conductors. The unbalance current is amplified in amplifier 22 and then selectably coupled to an integrator 23 by a cascade connection of a pair of synchronous switches 24, 25. The switching of the first synchronous switch 24 is controlled by a-c line potential as developed between neutral and line conductors 13 and 15, and the switching of the second synchronous switch 25 is controlled by oscillations coupled thereto from oscillator 19. Synchronous switches 24 and 25 may be balanced so that the signals controlling their switching do not appear in their respective output signals or, alternatively, need not be balanced.

For the condition where there is no ground fault on any of the conductors 13, 14 and 15, the sum of the currents flowing to a load 16 from sources 11 and 12 along these conductors will equal the sum of the currents returning from load 16 to sources 11 and 12 along these conductors at each and every instant. Therefore, there will be no unbalance current induced in sensing coil 21a. At the same time, since the neutral conductor 13 is returned to ground only at point 17, there is no coupling of the amplified oscillations from buffer amplifier 20 to the neutral conductor 13 by means of transformer 18. Therefore, the combined currents in the sensing coil 21a are zero-valued. The subsequent synchronous detections of this zero-valued secondary winding current (as examplified by amplifier 22) by switches 24 and 25 will result in no direct component in the input signal to integrator 23. The integral of this zero-average-value signal appearing as the output signal of integrator 23 will be insufficiently large to overcome the threshold presented by the threshold detector 26, and so detector 26 will not provide an output signal indicative of the presence of a ground fault on any of the conductors 13, 14, or 15.

For the condition where there is a ground fault on the neutral conductor 13 somewhere between ground point 17 and the load, as noted previously, a current responsive to the oscillations of oscillator 19 and of the same frequency flows in conductor 13. This current flow induces a proportional flow of current in secondary winding 21a. The secondary winding current is amplified by amplifier 22, is "chopped" by synchronous switch 24 and is applied in chopped form to synchronous switch 25. Synchronous switch 25 synchronously detects the amplified and chopped oscillations to yield a direct component of signal to the input circuit of integrator 23. The time integral of this direct component as supplied from integrator 23 to threshold detector 26 quickly reaches a level exceeding the detector threshold, assuming the unbalance current supplied by winding 21a is of substantial amplitude. This causes a change in the level of the output signal from threshold detector 26, which signal is amplified by relay driver amplifier 27 and applied to a three-pole single-throw relay switch 28. The latter opens and interrupts the flow of power to load 16.

For the condition where there is a ground fault on one of the line conductors 14 and 15, an unbalance current will be induced in the sensing coil 21a. This unbalance current is amplified by amplifier 22 and synchronously detected against line frequency by detector 24 to yield a direct component in its output signal which is chopped by synchronous switch 25 and applied in chopped form to the input circuit of integrator 23. The time integral of this direct component as supplied from integrator 23 to threshold detector 26 quickly reaches a level exceeding the detector threshold, assuming the unbalance current supplied by winding 21a to be of substantial amplitude. This causes a change in the level of the output signal from threshold detector 26 which signal is amplified by relay driver amplifier 27 and applied to a three-pole single-relay switch. Again, the latter opens and interrupts the flow of power to load 16.

FIG. 2 shows an alternative system 10' in which the cascade connection of synchronous switches 24 and 25 is arranged in opposite order to that in system 10 of FIG. 1. That is, in system 10' the synchronous switch 25 (the switch of which is controlled by oscillations from oscillator 19) precedes, rather than follows, synchronous switch 25, which is switched at line frequency. The amplifier 22 shown as preceding the synchronous switches 24 and 25 in the FIG. 1 and FIG. 2 diagrams may instead appear between the synchronous switches 24 and 25 or after them. Of amplifier 22 may appear after the integrator 23. The amplifier 22 may be subsumed into either or both of the synchronous switches 24 and 25. Or amplification may be distributed throughout the cascade connection linking the sensing coil 21a to the threshold detector 26.

Generally speaking, it is desirable to keep to a low value the power which is delivered by the buffer amplifier 20 into the neutral conductor when the latter has a ground fault. This is to avoid placing oscillations on the conductors 13, 14 and 15 so large as to adversely affect certain types of load 16 and to avoid over-heating of buffer amplifier 20 during delivery of power. In a typical design, 50 millivolts of power may be delivered by buffer amplifier 20 when a 100 milliohm ground fault appears on neutral conductor 13. At the same time, the ground fault interrupter system 10 or 10' often operates in an environment plagued with electrical noise arising from switching transients, commutator noise from motor loads, harmonic currents from SCR controls or the like, which have power levels at least as high as that of the oscillations coupled through transformer 18 during neutral ground faults. This electrical noise should be discriminated against so that it will be unlikely to cause the ground fault interrupter system 10 or 10' to interrupt the delivery of power to load 16.

According to the present invention, this discrimination against electrical noise is provided by selectivity in the time domain—that is, time-domain filtering—obtained by using synchronous switch 25. Synchronous switch 25 permits no coupling of signals from secondary winding 21a to integrator 23 except when a pulse from oscillator 19 is coupled to primary winding 18a. This excludes a substantial amount of electrical noise from being coupled through to integrator 23. But, the entire energy in oscillator pulses sensed by winding 21a during neutral ground-fault conditions is coupled to integrator 23 and may subsequently be detected by threshold detector 26. All the energy of the pulse at each harmonic of its repetition rate is recovered with time domain filtering. With frequency domain filtering as would be obtained by conventional LC band-pass filter networks, this is impractical to do.

The synchronous switch 25 used for time-domain filtering is simply constructed within the confines of an integrated circuit also including elements 19, 20, 22, 23, 24, 26 and 27 or substantial portions of them. The elements of a frequency domain filter normally include inductors or capacitors which are not integrable.

What is claimed is:

1. A ground-fault detector for an alternating current power system, employing a plurality of conductors, the neutral one of said conductors being connected to ground at one point, said detector comprising, in combination;

means responsive to the connection to ground of said neutral conductor at a second point for inducing a flow of current in said neutral conductor at a frequency substantially higher than the alternating current power frequency;

means responsive to a connection to ground of a conductor other than the neutral conductor for producing a ground fault signal at the alternating current power frequency; and ground fault sensing means including means responsive to said induced current at said substantially higher frequency for synchronously detecting the same at said higher frequency, and means responsive to said ground fault signal at the alternating current power frequency for synchronously detecting the same at said alternating current power frequency.

2. A ground fault detector as set forth in claim 1 including means for combining the responses of said means responsive to said induced current at said substantially higher frequency and of said means responsive to said ground fault signal at the alternating current power frequency to provide a common signal indicative of the presence or absence of ground faults on any of said conductors.

3. A ground fault detector for use in an alternating current power system employing a plurality of conductors, the neutral one of said conductors being connected to ground at one point, said detector comprising, in combination:

means responsive to the connection to ground of said neutral conductor at a second point for providing a first ground fault signal at a frequency substantially higher than the alternating currennt power frequency;

means responsive to a connection to ground of a conductor other than the neutral conductor for producing a second ground fault signal at the alternating current flow frequency;

means for additively combining said first and said second ground fault signals to supply a composite signal; and a pair of synchronous detectors respectively comprising a synchronous switch being opened and closed at said alternating current flow frequency and a synchronous switch being opened and closed at said substantially higher frequency, said synchronous detectors being connected in cascade to synchronously detect said composite signal to obtain an indication of a ground fault on any of said conductors.

4. A ground-fault detector for use in an a-c power system with a neutral conductor and a plurality of line conductors, said ground-fault detector comprising:

an oscillator for producing oscillations of a frequency differing from the frequency of said a-c power;

means for coupling oscillations to said neutral conductor on the load side thereof with respect to a ground conection responsive to any ground-fault appearing on said load side of said neutral conductor;

a differential current transformer for receiving said neutral and said line conductors as primaries of said transformer, and said transformer having also a secondary winding;

signal integrating means, having an input and an output circuit, for providing a signal at its output circuit which is a time integral of signal supplied to its input circuit;

a first synchronous switch controlled by oscillations applied thereto from said oscillator;

a second synchronous switch controlled by said conductor-to-conductor potential applied thereto from said pair of said conductors;

means connecting said first synchronous-switch after said second synchronous switch in cascade connection between said secondary winding and the input circuit of said signal integrating means; and a threshold detector having an input circuit connected to the output circuit of said signal integrating means and having an output circuit for providing indications of a ground fault on said load side of said neutral conductor when the level of signal supplied to its input circuit from the output circuit of said signal integrating means exceeds a predetermined threshold level.

5. A ground-fault detector for use in an a-c power system with a neutral conductor and a plurality of line conductors, said ground-fault detector comprising:

an oscillator for producing oscillations of a frequency differing from the frequency of said a-c power;

means for coupling oscillations to said neutral conductor on the load side thereof with respect to a ground connection responsive to any ground-fault appearing on said load side of said neutral conductor;

a differential current transformer for receiving said neutral and said line conductors as primaries of said transformer, and said transformer having also a secondary winding;

signal integrating means, having an input and an output circuit, for providing a signal at its output circuit which is a time integral of signal supplied to its input circuit;

a first synchronous switch controlled by oscillations applied thereto from said oscillator;

a second synchronous switch controlled by said conductor-to-conductor potential applied thereto from said pair of said conductors;

means connecting said first synchronous switch before said second synchronous switch is cascade connection between said secondary winding and the input circuit of said signal integrating means; and a threshold detector having an input circuit connected to the output circuit of said signal integrating means and having an output circuit for providing indications of a ground fault on said load side of said neutral conductor when the level of signal supplied to its input circuit from the output circuit of said signal integrating means exceeds a predetermined threshold level.

* * * * *